United States Patent
Dasarathan

(10) Patent No.: US 11,055,444 B2
(45) Date of Patent: Jul. 6, 2021

(54) SYSTEMS AND METHODS FOR CONTROLLING ACCESS TO A PERIPHERAL DEVICE

(71) Applicant: Symantec Corporation, Mountain View, CA (US)

(72) Inventor: Boovaragavan Dasarathan, Culver City, CA (US)

(73) Assignee: NortonLifeLock Inc., Tempe, AZ (US)

( * ) Notice: Subject to any disclaimer, the term of this patent is extended or adjusted under 35 U.S.C. 154(b) by 158 days.

(21) Appl. No.: 16/013,921

(22) Filed: Jun. 20, 2018

(65) Prior Publication Data

US 2019/0392180 A1    Dec. 26, 2019

(51) Int. Cl.
| | | |
|---|---|---|
| G06F 21/00 | (2013.01) | |
| G06F 21/82 | (2013.01) | |
| G06F 9/455 | (2018.01) | |
| G06F 13/10 | (2006.01) | |
| G06F 13/38 | (2006.01) | |

(52) U.S. Cl.
CPC .......... *G06F 21/82* (2013.01); *G06F 9/45558* (2013.01); *G06F 13/105* (2013.01); *G06F 13/385* (2013.01); *G06F 2009/45579* (2013.01)

(58) Field of Classification Search
CPC .... G06F 21/82; G06F 9/45558; G06F 13/105; G06F 13/385; G06F 2009/45579
See application file for complete search history.

(56) References Cited

U.S. PATENT DOCUMENTS

| | | | |
|---|---|---|---|
| 10,296,954 B1* | 5/2019 | Mishra | G06Q 30/0641 |
| 2007/0180454 A1 | 8/2007 | Fujimoto et al. | |
| 2012/0255000 A1 | 10/2012 | Sallam | |
| 2013/0138860 A1* | 5/2013 | Moore | G06F 13/28 710/313 |
| 2014/0089538 A1* | 3/2014 | Bachrany | G06F 21/82 710/37 |
| 2015/0142993 A1* | 5/2015 | Blanc | G06F 13/4068 710/16 |
| 2015/0363613 A1* | 12/2015 | O'Dowd | G06F 21/82 726/23 |
| 2016/0077984 A1* | 3/2016 | Steinert | G06F 13/1642 710/309 |

(Continued)

OTHER PUBLICATIONS

International Search Report and Written Opinion received for PCT Application Serial No. PCT/US2019/024916 dated May 29, 2019, 10 pages.

*Primary Examiner* — Eleni A Shiferaw
*Assistant Examiner* — Stephanie S Ham
(74) *Attorney, Agent, or Firm* — FisherBroyles, LLP

(57) ABSTRACT

The disclosed computer-implemented method for controlling access to a peripheral device may include receiving an input/output request related to a process attempting to access the peripheral device. The method can also include determining an access state for the process indicative of whether the process will be allowed to gain access to the peripheral device. The access state can be based on a context property of the process. The method can further include responding to the input/output request with initiation of a virtual peripheral output from a virtual peripheral device if the access state is indicative of the process not being allowed access to the peripheral device. Various other methods, systems, and computer-readable media are also disclosed.

17 Claims, 10 Drawing Sheets

(56) References Cited

U.S. PATENT DOCUMENTS

| | | | |
|---|---|---|---|
| 2018/0225230 A1* | 8/2018 | Litichever | G06F 13/107 |
| 2018/0227347 A1* | 8/2018 | Rombakh | H04L 65/607 |
| 2019/0156039 A1* | 5/2019 | Harsany | G06F 21/575 |
| 2019/0236040 A1* | 8/2019 | Armstrong | H01R 31/065 |

* cited by examiner

SYSTEMS AND METHODS FOR CONTROLLING ACCESS TO A PERIPHERAL DEVICE

BACKGROUND

An increasing number of applications and services are being made available over networks such as the Internet. In addition, hardware and/or software used to support those services is also increasingly being made available over networks. Remote access to hardware, such as computer peripheral devices, adds convenience and enhances communication options, but also comes with risks. The proliferation of malware mechanisms (e.g., worms, viruses, Trojan horses, rootkits) imposes a threat to the privacy and integrity of a personal and corporate computing devices and associated assets. This threat reinforces the ongoing desire for development of network security measures to ensure that unauthorized and incompliant devices are not allowed access to various network assets. However, it is also desirable that such measures do not excessively interfere with legitimate access, and when authorized access is lost or blocked, it is desirable for such authorized remote users to be provided with accurate and informative information related to the access failure.

The instant disclosure, therefore, identifies and addresses a need for systems and methods for controlling access to a peripheral device.

SUMMARY

As will be described in greater detail below, the instant disclosure describes various systems and methods for controlling access to a peripheral device.

In one example, a method for controlling access to a peripheral device may include receiving an input/output request related to a process attempting to access the peripheral device. The method can also include determining an access state for the process indicative of whether the process will be allowed to gain access to the peripheral device. The access state can be based on a context property of the process. The method can further include responding to the input/output request with initiation of a virtual peripheral output from a virtual peripheral device if the access state is indicative of the process not being allowed access to the peripheral device.

In some embodiments, the determining of the access state can include evaluating the context property based on a predefined rule indicative of whether the process should be allowed access to the peripheral device.

In some embodiments, the determining of the access state can include receiving, by the one or more computing devices from a user, an indication of whether the process should be allowed access to the peripheral device.

In some embodiments, the virtual peripheral output can include information indicative of the access state of the process.

In some embodiments, the virtual peripheral output can include information indicative of whether the process is compatible with the peripheral device.

In some embodiments, the one or more computing devices can respond to subsequent input/output requests from the process with the virtual peripheral output from the virtual peripheral device.

In some embodiments, the one or more computing devices can generate an alert to a user associated with the peripheral device that the process has been denied access to the peripheral device.

In some embodiments, the responding, by the one or more computing devices, to the input/output request can include initiating the virtual peripheral device in response to the determining that the access state is indicative of the process not being allowed access to the peripheral device.

In some embodiments, the initiating of the virtual peripheral device can include emulating a physical peripheral device using at least one video class driver.

In some embodiments, the peripheral device is a webcam, the virtual peripheral device is a virtual webcam, and the virtual peripheral output is a video stream.

In one embodiment, a system for controlling access to a peripheral device may include several modules stored in memory, including a receiving module that receives an input/output request related to a process attempting to access the peripheral device, a determination module that determines an access state for the process indicative of whether the process will be allowed to gain access to the peripheral device, the access state being based on a context property of the process, and a response module that responds to the input/output request with initiation of a virtual peripheral output from a virtual peripheral device if the access state is indicative of the process not being allowed access to the peripheral device. The system may also include at least one physical processor configured to execute the receiving module, the response module, and the response module.

In some embodiments, the determination module can evaluate the context property based on a predefined rule indicative of whether the process should be allowed access to the peripheral device.

In some embodiments, the determination module can receive an indication of whether the process should be allowed access to the peripheral device.

In some embodiments, the virtual peripheral output can include information indicative of the access state of the process.

In some embodiments, the virtual peripheral output can include information indicative of whether the process is compatible with the peripheral device.

In some embodiments, the response module can respond to subsequent input/output requests from the process with the virtual peripheral output from the virtual peripheral device.

In some embodiments, an alert generation module can generate an alert to a user associated with the peripheral device that the process has been denied access to the peripheral device, and the at least one physical processor can be configured to execute the alert generation module.

In some embodiments, the response module can initiate the virtual peripheral device in response to the determination module determining that the access state is indicative of the process not being allowed access to the peripheral device.

In some embodiments, the response module can emulate a physical peripheral device using at least one video class driver.

In some embodiments, the peripheral device can be a webcam and the virtual peripheral device can be a virtual webcam.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to receive an input/output request related to a process attempting to access the peripheral device, determine an access state for the process indicative of whether the process will be allowed to gain access to the peripheral device, the access state being based on a context property of the process, and respond to the input/output request with initiation of a virtual peripheral output from a virtual peripheral device if the access state is indicative of the process not being allowed access to the peripheral device.

In some embodiments, the determining of the access state can include evaluating the context property based on a predefined rule indicative of whether the process should be allowed access to the peripheral device.

In some embodiments, the determining of the access state can include receiving, from a user, an indication of whether the process should be allowed access to the peripheral device.

In some embodiments, the virtual peripheral output can include information indicative of the access state of the process.

In some embodiments, the virtual peripheral output can include information indicative of whether the process is compatible with the peripheral device.

In some embodiments, the non-transitory computer-readable medium can further comprise executable instructions that, when executed by the at least one processor of the computing device, cause the computing device to respond to subsequent input/output requests from the process with the virtual peripheral output from the virtual peripheral device.

In some embodiments, the non-transitory computer-readable medium can further comprise executable instructions that, when executed by the at least one processor of the computing device, cause the computing device to generate an alert to a user associated with the peripheral device that the process has been denied access to the peripheral device.

In some embodiments, the responding to the input/output request can include initiating the virtual peripheral device in response to the determining that the access state is indicative of the process not being allowed access to the peripheral device.

In some embodiments, the initiating of the virtual peripheral device can include emulating a physical peripheral device using at least one video class driver.

In some embodiments, the peripheral device is a webcam, the virtual peripheral device can be a virtual webcam, and the virtual peripheral output can be a video stream.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
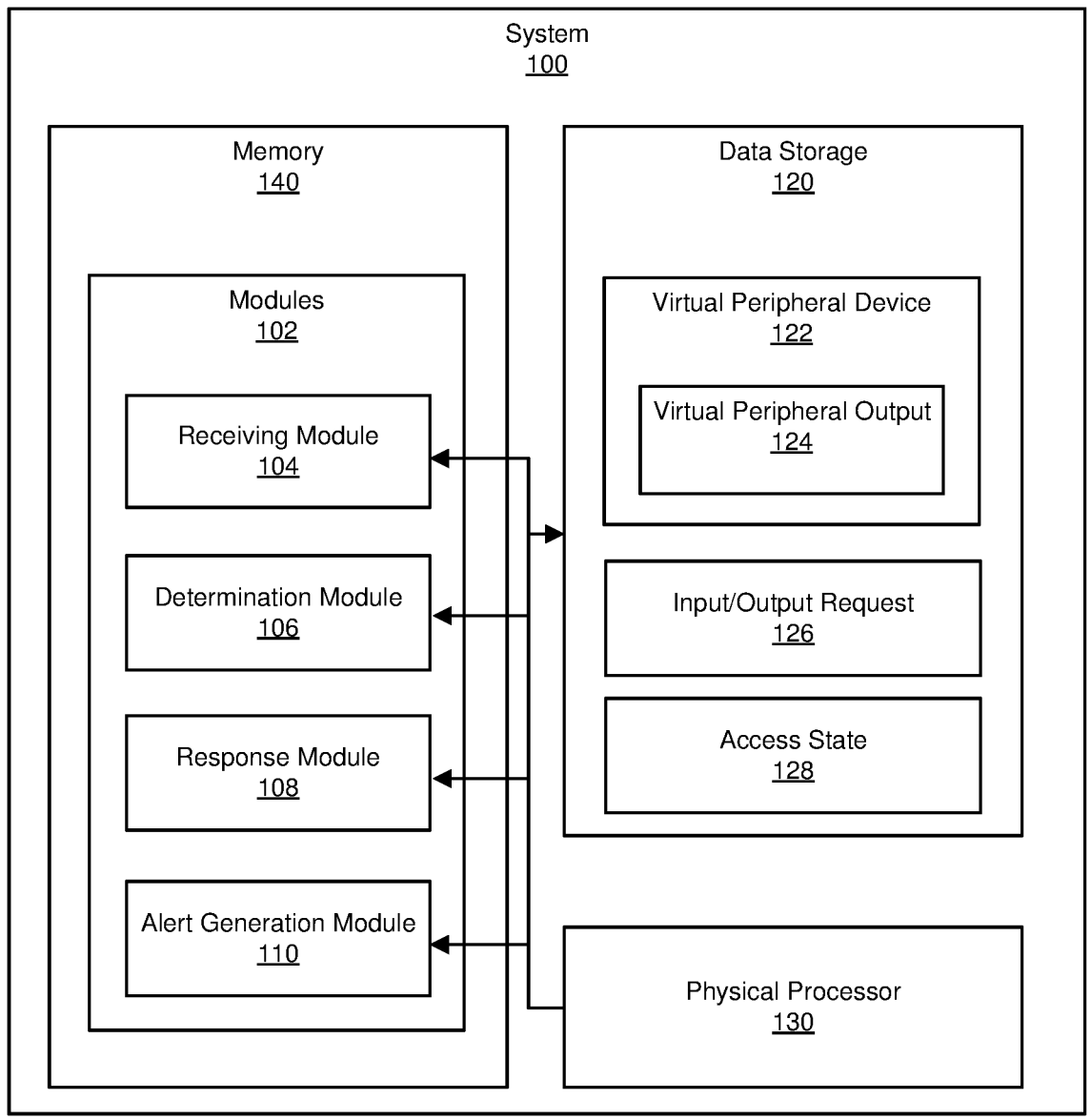
FIG. 1 is a block diagram of an example system for controlling access to a peripheral device.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for controlling access to a peripheral device. As will be explained in greater detail below, by blocking a process from gaining access to a peripheral device by redirecting the process to a virtual version of the peripheral device, the peripheral device will remain secure while the system continues to respond to I/O requests from the process and communicate with the process via the virtual peripheral device. Moreover, by continuing to respond to I/O requests and communicating with the process via the virtual peripheral device, the system is able to provide information to the process related to the denial of access rather than just dropping the I/O request. This is important because when the I/O requests are just dropped, the process can report incorrect information about the lack of access to the peripheral device, which can lead to confusing connection errors and inefficient troubleshooting of the connection error.

Figure 2:
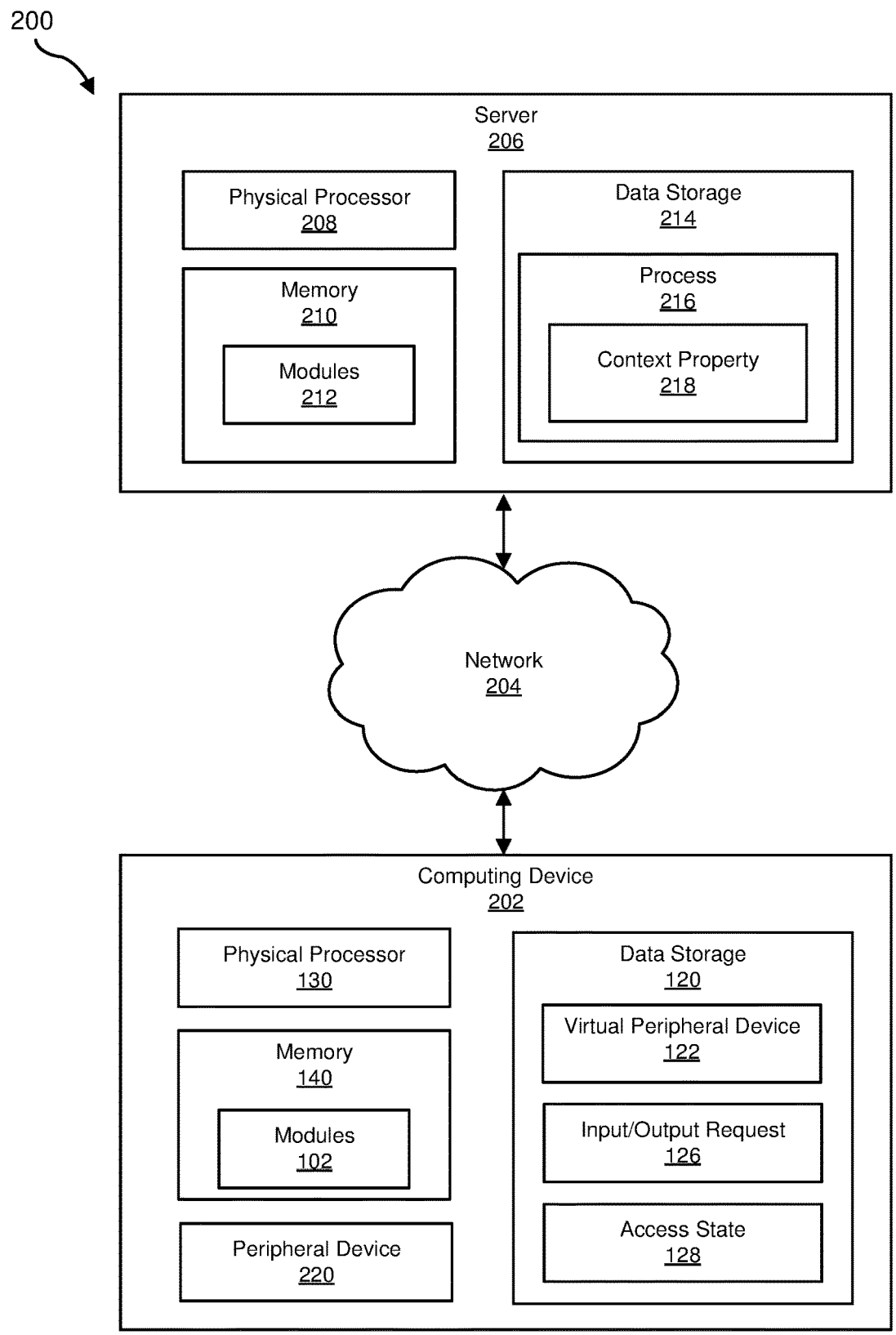
FIG. 2 is a block diagram of an additional example system for controlling access to a peripheral device.

The following will provide, with reference to FIGS. 1-2, detailed descriptions of example systems for controlling access to a peripheral device. Detailed descriptions of corresponding computer-implemented methods will also be provided in connection with FIG. 3. Detailed descriptions of exemplary virtual peripheral devices will be provided in connection with FIGS. 4-5. In addition, detailed descriptions of an example computing system and network architecture capable of implementing one or more of the embodiments described herein will be provided in connection with FIGS. 9 and 10, respectively.

FIG. 1 is a block diagram of an example system 100 for controlling access to a peripheral device 220 (shown in FIG. 2). As illustrated in this figure, example system 100 may include one or more modules 102 for performing one or more tasks. As will be explained in greater detail below, modules 102 may include a Receiving module 104, a Determination module 106, a Response module 108, and an alert module 110. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate controlling access to a peripheral device 220. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more data storage devices, such as data storage device 120. Data storage device 120 generally represents any type or form of storage device or medium capable of storing data and/or other computer-readable instructions. For example, data storage device 120 may be a magnetic disk drive (e.g., a so-called hard drive), a solid-state drive, a floppy disk drive, a magnetic tape drive, an optical disk drive, a flash drive, or the like.

In certain embodiments, data storage device 120 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Data storage device 120 may also include other similar structures or devices for allowing computer software, data, or other computer-readable instructions to be loaded into system 100. For example, data storage device 120 may be configured to read and write software, data, or other computer-readable information. Data storage device 120 may also be a part of system 100 or may be a separate device accessed through other interface systems.

In certain embodiments, such as the illustrated example in FIG. 1, data storage device 120 can store data representative of a virtual peripheral device 122, a virtual peripheral output 124, an Input/Output (I/O) Request 126, and an access state 128 of a process requesting access to a peripheral device 220 as described below.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to control access to a peripheral device 220. For example, and as will be described in greater detail below, one or more of modules 102 may cause computing device 202 and/or server 206 to recite steps of method claim using FIG. 2

Computing device 202 generally represents any type or form of computing device capable of reading computer-executable instructions. For example, computing device 202 may include an endpoint device (e.g., a mobile computing device) running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of facilitating access to a remote computing device 202. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
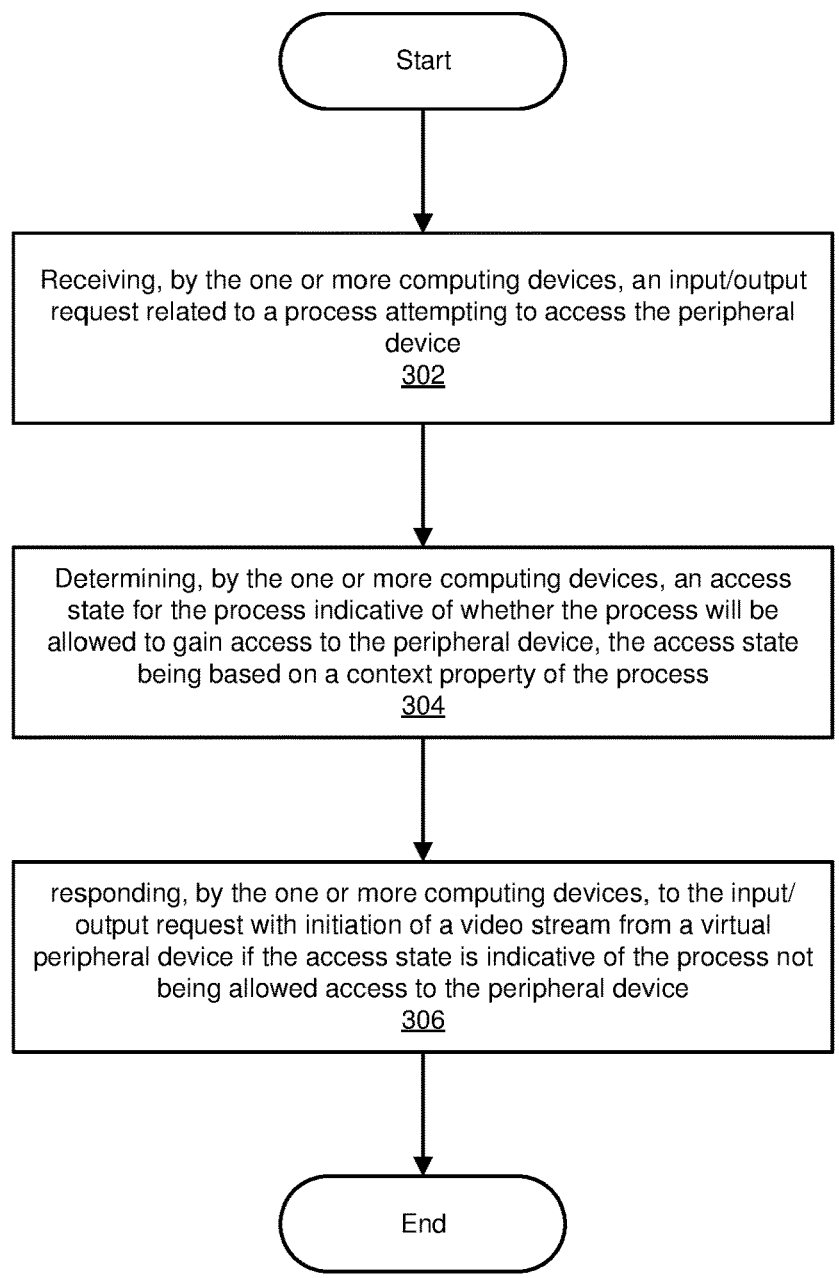
FIG. 3 is a flow diagram of an example method for controlling access to a peripheral device.

FIG. 3 is a flow diagram of an example computer-implemented method 300 for controlling access to a peripheral device 220. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive an I/O request 126 related to a process attempting to access a peripheral device 220. For example, receiving module 104 may, as part of computing device 202 in FIG. 2, receive an I/O request invoked by a user mode application seeking access to a peripheral device 220.

The term "I/O request," as used herein, generally refers to a request made in an attempt by an executable file to access a peripheral device 220. Examples of I/O requests include, without limitation, requests from applications for communication with a peripheral device 220. I/O requests can include requests made by user mode applications and, in some cases, passed along by an application programming interface (API) function to a kernel-mode I/O manager. Such I/O requests can include requests that have been modified, encapsulated, or translated by an I/O manager, such as I/O request packets (IRPs), for the peripheral device driver. I/O requests can also include system calls or operation calls to the device driver via a file system.

The systems described herein may perform step 302 such that the receiving module 104 can receive an I/O request from a requesting process 216 in a variety of ways.

Figure 4:
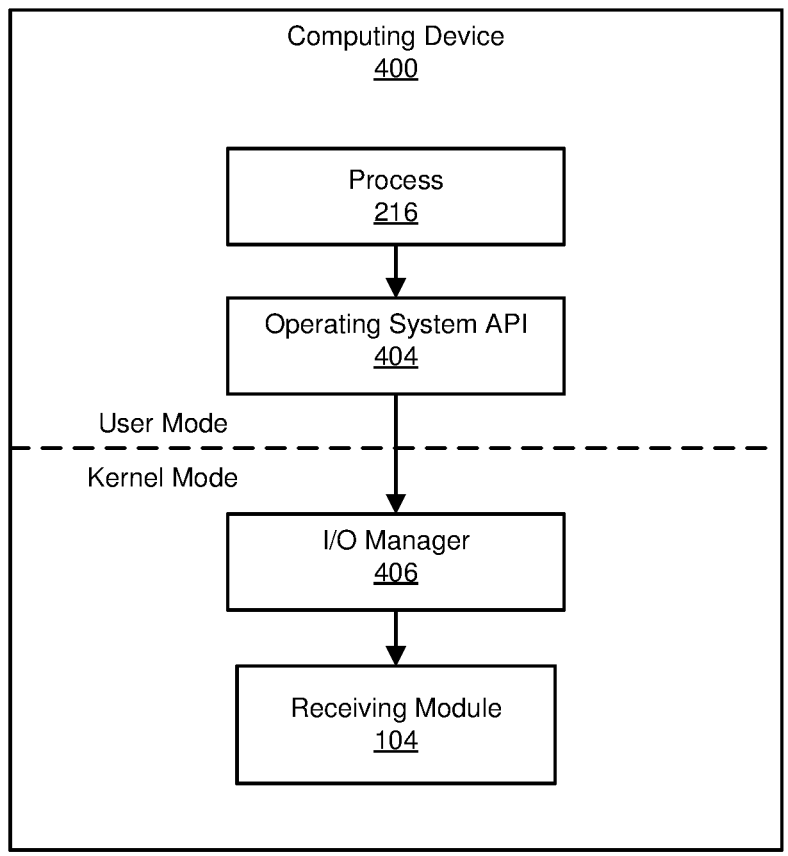
FIG. 4 is a block diagram of a system having an example of an I/O architecture for controlling access to a peripheral device.

In one example, shown in FIG. 4, the receiving module 104 can be implemented in a computing device 400 where the receiving module 104 is configured to receive IRPs from the requesting process 216 via an operating system API 404 and an I/O manager 406. In some such embodiments, the requesting process 216 initiates an I/O request in user mode and issues the I/O request by calling an appropriate function of the operating system API 404, which in turn passes the I/O request to the kernel-mode I/O manager 406. The I/O manager 406 translates the I/O request into an IRP, which is a data structure that describes the I/O request as appropriate for device drivers, and which is passed to the receiving module 104.

Figure 5:
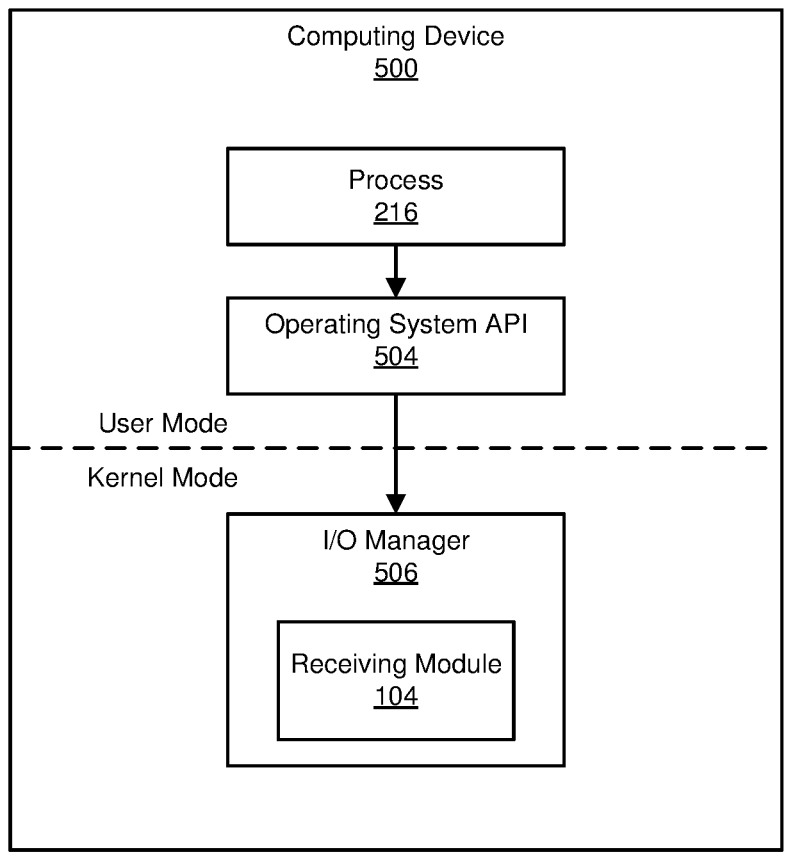
FIG. 5 is a block diagram of a system having another example of an I/O architecture for controlling access to a peripheral device.

In another example, shown in FIG. 5, the receiving module 104 can implemented in a computing device 500 where the receiving module 104 is integrated into an I/O manager 506 for handling I/O requests from a user mode operating system API 504. In some such embodiments, the requesting process 216 initiates an I/O request in user mode and issues the I/O request by calling an appropriate function of the operating system API 504, which in turn passes the I/O request to the kernel-mode I/O manager 506 that includes the receiving module 104.

Figure 6:
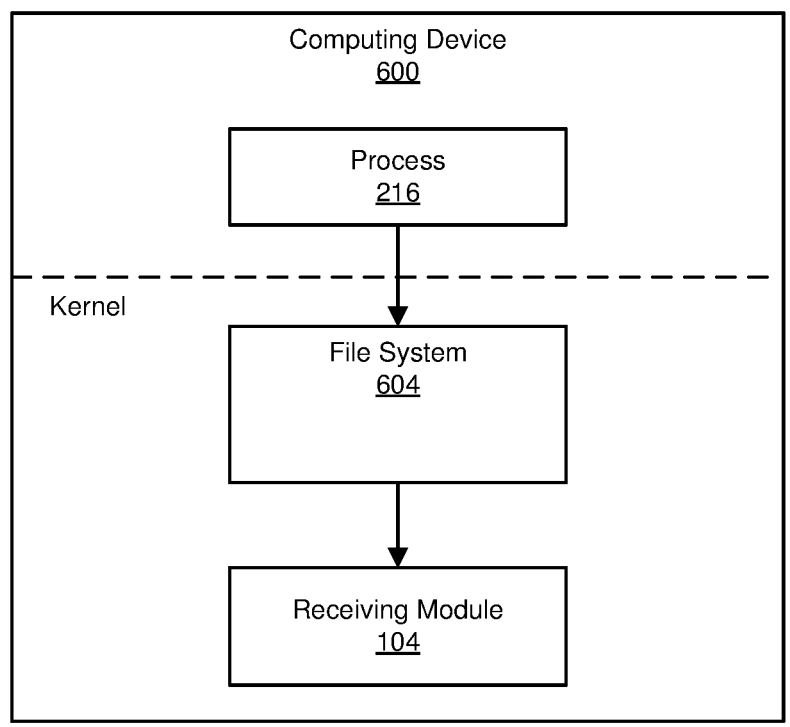
FIG. 6 is a block diagram of a system having another example of an I/O architecture for controlling access to a peripheral device.

In another example, shown in FIG. 6, the receiving module 104 can implemented in a computing device 600 that lacks an I/O manager, such as a Linux-based device. In some such embodiments, the requesting process 216 initiates an I/O request, which the operating system kernel maps to the receiving module 104 via the file system 604.

At step 304, one or more of the systems described herein may determine an access state 128 for the process 216 indicative of whether the process 216 will be allowed to gain access to the peripheral device 220, the access state 128 being based on a context property 218 of the process 216. In some embodiments, the access state 128 can be determined by evaluating the context property 218 based on a predefined rule or rules indicative of whether the process 216 should be allowed access to the peripheral device 220. In some embodiments, the access state 128 can be determined based on input from a user having authority to grant or deny access to the peripheral device 220, for example where the input includes an indication of whether the process 216 should be allowed access to the peripheral device 220.

For example, determination module 106 may determine that the attempted access request is anomalous for the specific entity. As used herein, the term "anomalous" generally refers to actions that satisfy a statistical, analyzed, and/or predicted measure (e.g., threshold level) of abnormality or deviation from a statistical, expected, and/or predicted baseline or normal level. Also, as used herein, the term "context property" generally refers to any attribute of the process 216 that a security or prediction analysis may ascertain as relevant to detecting actions that satisfy a statistical, analyzed, and/or predicted measure (e.g., threshold level) of abnormality or deviation from a statistical, expected, and/or predicted baseline or normal level. Moreover, as used herein, the term "access state" generally refers to any value, flat, score, or measurement that indicates whether the process 216 is granted or denied access to the peripheral device 220.

Determination module 106 may determine that the attempted access request is anomalous in a variety of ways and set an access state 128 accordingly. In some examples, determination module 106 may determine that the attempted action is anomalous for the specific entity by calculating a degree to which the attempted action is estimated to be anomalous. In further examples, determination module 106 may determine that the attempted action is anomalous for the specific entity further by determining that the calculated degree satisfies a threshold. For example, determination module 106 may establish or define a level of deviation (e.g., standard deviation) that functions as a threshold for categorizing actions as either routine or anomalous.

In some examples, determination module 106 may establish upper and/or lower bounds as defining a normal range for any first-order, second-order, and/or n-order value. These values may include counts (e.g., counts of attempts to access a specific set of files or resources, counts of login attempts, counts of different network devices, and/or counts of commands issued to one or more network or peripheral devices), times of day, days of the week, calendar days, and/or second-order measures of these (e.g., rates in terms of time). Determination module 106 may base upper and/or lower bounds on manual settings, administrator settings, predefined values, default values, a statistical analysis of previous behavior by the specific entity, and/or a statistical analysis of previous behavior by one or more other entities (e.g., other entities that are comparable to the specific entity, such as other network devices having the same category, type, brand, and/or functionality, and such as other users having the same or similar role within an organization, level of administrative privilege, location, and/or office).

At step 306, one or more of the systems described herein may respond to the I/O request 126 with initiation of a virtual peripheral output 124 from a virtual peripheral device 122 if the access state 128 is indicative of the process 216 not being allowed access to the peripheral device 220. In some embodiments, the one or more systems described herein may also respond by generating an alert to a user having authority over the peripheral device that the process 216 has been denied access to the peripheral device 122. In some embodiments, the virtual peripheral output 124 can include information indicative of the access state 128 of the process 216. In some embodiments, the virtual peripheral output 124 can include information indicative of whether the process 216 is compatible with the peripheral device 122.

As used herein, the term "virtual peripheral device" generally refers to a collection of executable resources (e.g., drivers, methods, functions, and/or procedures) that may be accessed by process, such as process 216, and that emulates the physical peripheral device 220. As also used herein, the term "virtual peripheral output" generally refers to any output signal or message transmitted from the virtual peripheral device 122 in a format suitable for emulating output of the physical peripheral device 220.

As used herein, the term "peripheral device" generally refers to any internal or external component of a computer device that may be accessed by a process to receive input from the process and/or send output to the process.

Figure 7:
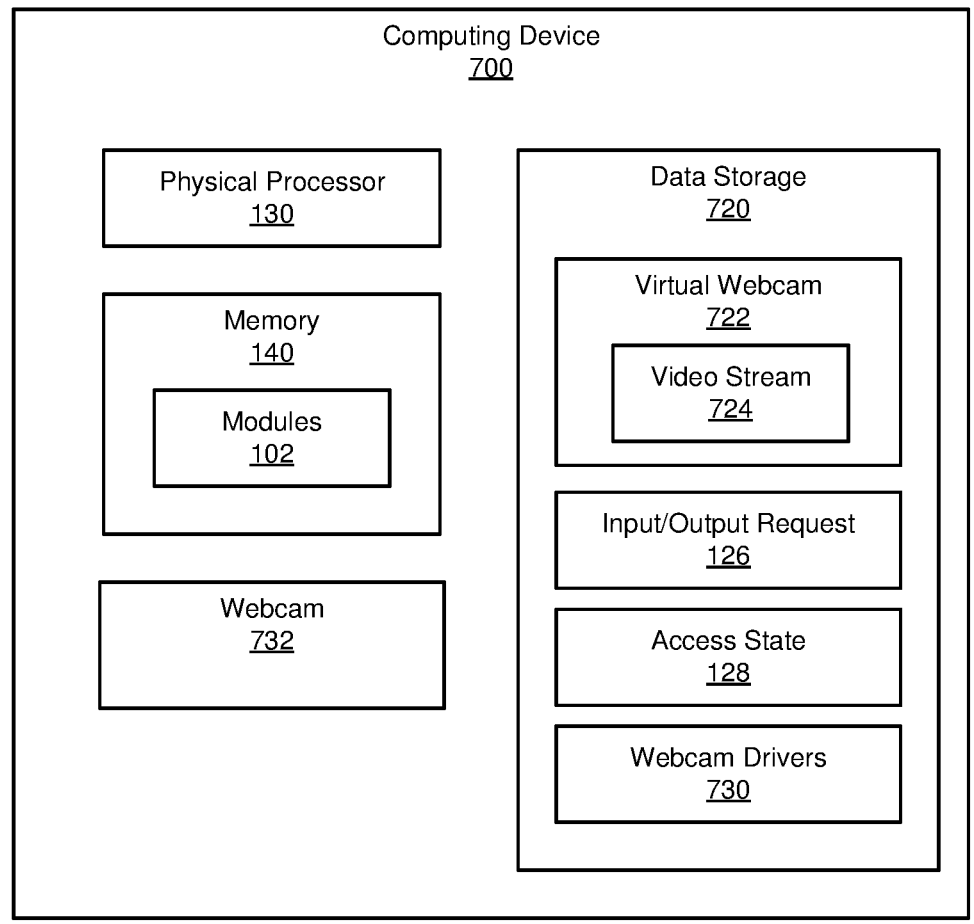
FIG. 7 is a block diagram of an example system for controlling access to a webcam as an example of a peripheral device.

In one example, shown in FIG. 7, the virtual peripheral device 122 can implemented in a computing device 700 where the virtual peripheral device 122 is embodied as a virtual webcam 722. The virtual webcam 722 is configured to produce video stream packets 724 in response to the I/O request 126, and additional subsequent I/O requests 126, from the process 216 without dropping any I/O requests 126. The video stream packets 724 serve as examples of virtual peripheral output 124. The video stream packets 724 may contain a configured message stating that the process 216 has been denied access to the actual physical webcam 732. The message can optionally also include additional information about the reason that access has been denied, such as a lack of permission or compatibility errors. The message can then be displayed to the user running the process 216 instead of a video stream from the actual webcam 732. In one example, the virtual webcam 722 can be implemented using filter drivers that host the virtual webcam based on Microsoft Kernel Stream provider class drivers.

Figure 8:
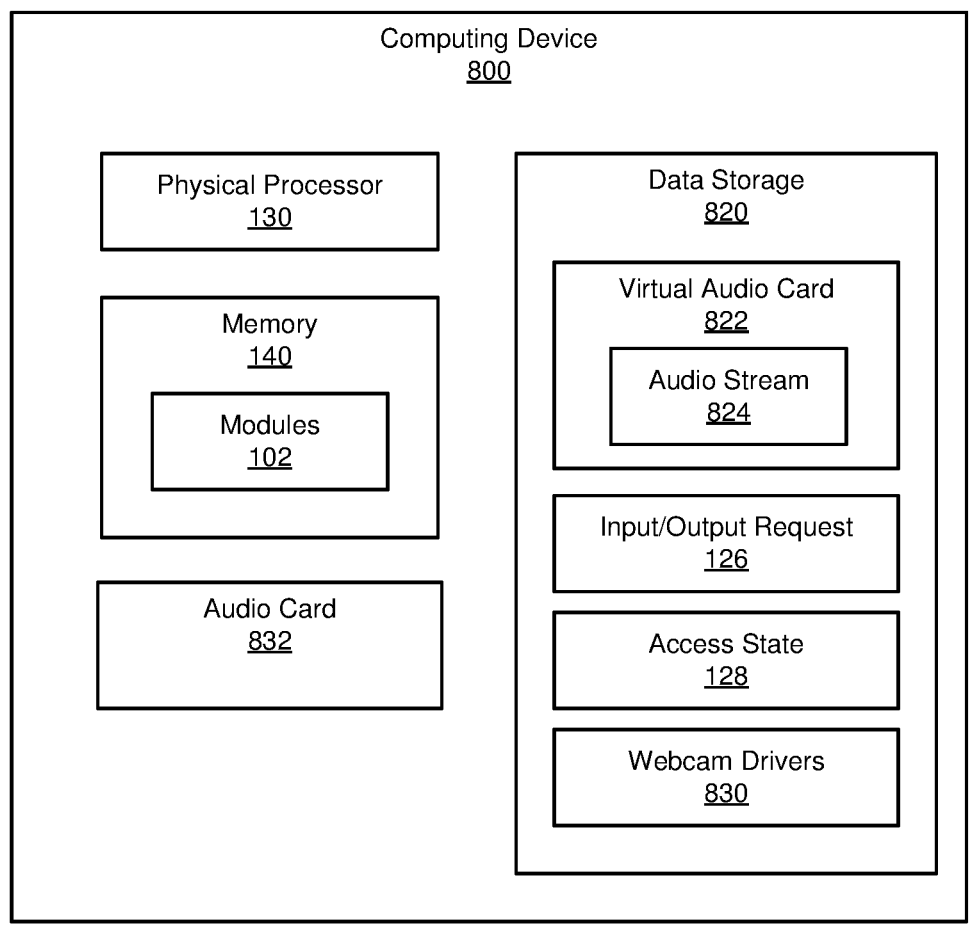
FIG. 8 is a block diagram of an example system for controlling access to an audio card as an example of a peripheral device.

In one example, shown in FIG. 8, the virtual peripheral device 122 can implemented in a computing device 800 where the virtual peripheral device 122 is embodied as a virtual audio card 822. The virtual audio card 822 is configured to produce audio stream packets 824 in response to the I/O request 126, and additional subsequent I/O requests 126, from the process 216 without dropping any I/O requests 126. The audio stream packets 824 serve as examples of virtual peripheral output 124. The audio stream packets 824 may contain a configured message stating that the process 216 has been denied access to audio output from the actual audio card 832. The message can optionally also include additional information about the reason that access has been denied, such as a lack of permission or compatibility errors. The message can then be displayed to the user running the process 216 instead of an audio stream from the actual audio card 832.

As described above, systems and methods described herein may control access to a computer peripheral device by receiving I/O requests for access to the peripheral device prior to the requests being sent to the device drivers. Systems and methods described herein may determine whether the process seeking access to the peripheral device should be granted such access, for example based on properties of the process and/or input from the peripheral owner or other user having authority over the peripheral device. If it is determined that access should not be granted, the I/O requests is still handled by responding with access to a virtual version of the peripheral device that emulates the requested peripheral device. Also, the process will receive virtual output from the virtual peripheral device in a format it would have expected as output from the requested peripheral device. The virtual peripheral device can continue to respond to subsequent I/O requests from the requesting process with the virtual output. The virtual output can include information suitable for informing a user associated with the process that access to the peripheral device was denied and can include information as to the reason that access was denied. This allows the user associated with the process to understand reasons for the denied access rather than just seeing a connection error as would happen if the I/O requests were simply dropped.

Figure 9:
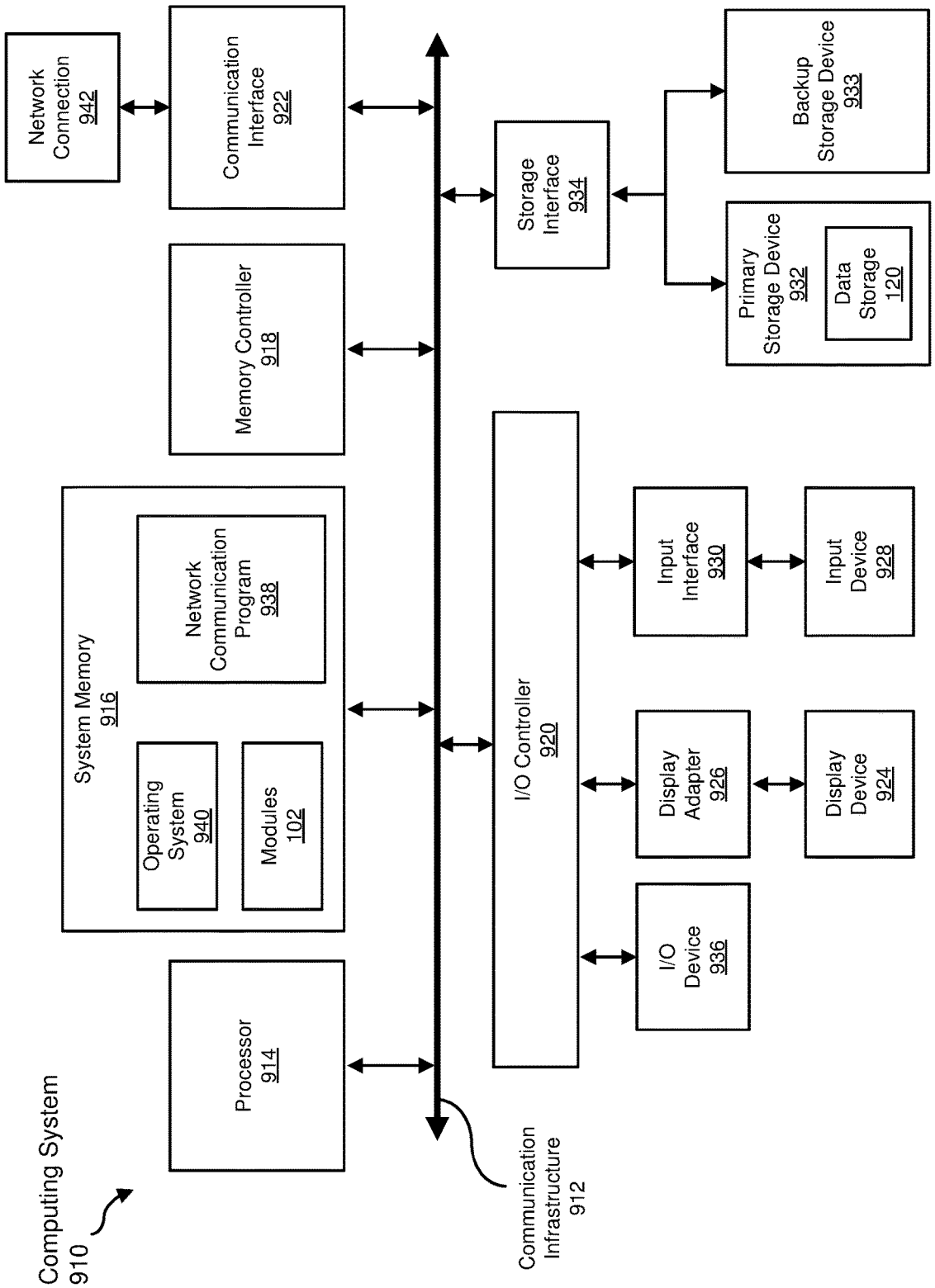
FIG. 9 is a block diagram of an example computing system capable of implementing one or more of the embodiments described and/or illustrated herein.

FIG. 9 is a block diagram of an example computing system 910 capable of implementing one or more of the embodiments described and/or illustrated herein. For example, all or a portion of computing system 910 may perform and/or be a means for performing, either alone or in combination with other elements, one or more of the steps described herein (such as one or more of the steps illustrated in FIG. 3). All or a portion of computing system 910 may also perform and/or be a means for performing any other steps, methods, or processes described and/or illustrated herein.

Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 919.

Processor 914 generally represents any type or form of physical processing unit (e.g., a hardware-implemented central processing unit) capable of processing data or interpreting and executing instructions. In certain embodiments, processor 914 may receive instructions from a software application or module. These instructions may cause processor 914 to perform the functions of one or more of the example embodiments described and/or illustrated herein.

System memory 916 generally represents any type or form of volatile or non-volatile storage device or medium capable of storing data and/or other computer-readable instructions. Examples of system memory 916 include, without limitation, Random Access Memory (RAM), Read Only Memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In some examples, system memory 916 may store and/or load an operating system 940 for execution by processor 914. In one example, operating system 940 may include and/or represent software that manages computer hardware and software resources and/or provides common services to computer programs and/or applications on computing system 910. Examples of operating system 940 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 910 may also include one or more components or elements in addition to processor 914 and system memory 916. For example, as illustrated in FIG. 9, computing system 910 may include a memory controller 918, an I/O controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI Express (PCIe), or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934.

As illustrated in FIG. 9, computing system 910 may also include at least one display device 924 coupled to I/O controller 920 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, example computing system 910 may also include at least one input device 928 coupled to I/O controller 920 via an input interface 930. Input device 928 generally represents any type or form of input device capable of providing input, either computer or human generated, to example computing system 910. Examples of input device 928 include, without limitation, a keyboard, a pointing device, a speech recognition device, variations or combinations of one or more of the same, and/or any other input device. The peripheral device 220 and examples thereof described herein also serve as examples of the input device 928.

Additionally or alternatively, example computing system 910 may include additional I/O devices. For example, example computing system 910 may include I/O device 936. In this example, I/O device 936 may include and/or represent a user interface that facilitates human interaction with computing system 910. Examples of I/O device 936 include, without limitation, a computer mouse, a keyboard, a monitor, a printer, a modem, a camera, a scanner, a microphone, a touchscreen device, variations or combinations of one or more of the same, and/or any other I/O device.

Communication interface 922 broadly represents any type or form of communication device or adapter capable of facilitating communication between example computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution.

In some examples, system memory 916 may store and/or load a network communication program 938 for execution by processor 914. In one example, network communication program 938 may include and/or represent software that enables computing system 910 to establish a network connection 942 with another computing system (not illustrated in FIG. 9) and/or communicate with the other computing system by way of communication interface 922. In this example, network communication program 938 may direct the flow of outgoing traffic that is sent to the other computing system via network connection 942. Additionally or alternatively, network communication program 938 may direct the processing of incoming traffic that is received from the other computing system via network connection 942 in connection with processor 914.

Although not illustrated in this way in FIG. 9, network communication program 938 may alternatively be stored and/or loaded in communication interface 922. For example, network communication program 938 may include and/or represent at least a portion of software and/or firmware that is executed by a processor and/or Application Specific Integrated Circuit (ASIC) incorporated in communication interface 922.

As illustrated in FIG. 9, example computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a solid state drive, a floppy disk drive, a magnetic tape drive, an optical disk drive, a flash drive, or the like. Storage interface 934 generally represents any type or form of interface or device for transferring data between storage devices 932 and 933 and other components of computing system 910. In one example, [data storage 120] from FIG. 1 may be stored and/or loaded in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 910 may be configured as an Application Specific Integrated Circuit (ASIC) adapted to implement one or more of the example embodiments disclosed herein.

Figure 10:
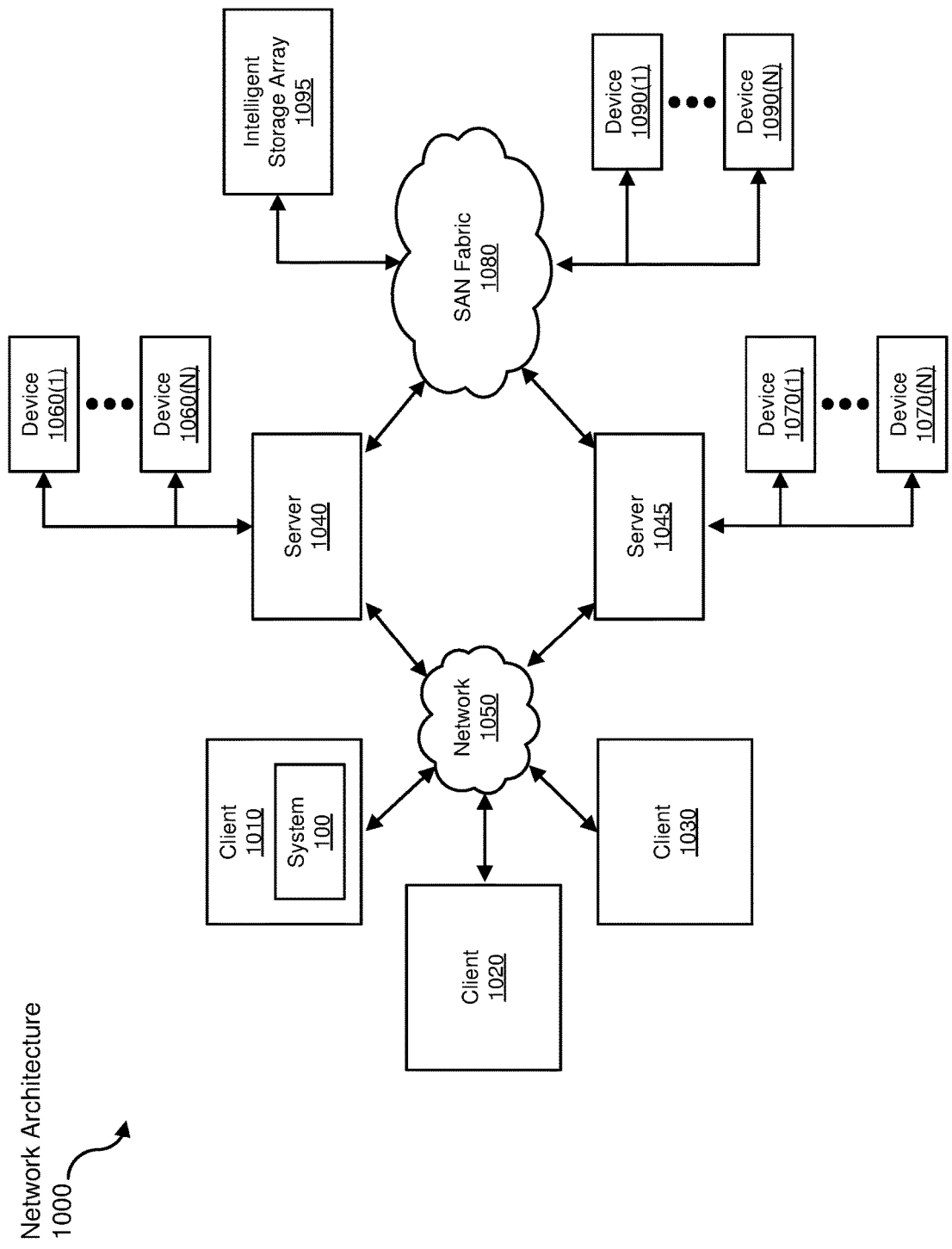
FIG. 10 is a block diagram of an example computing network capable of implementing one or more of the embodiments described and/or illustrated herein.

FIG. 10 is a block diagram of an example network architecture 1000 in which client systems 1010, 1020, and 1030 and servers 1040 and 1045 may be coupled to a network 1050. As detailed above, all or a portion of network architecture 1000 may perform and/or be a means for performing, either alone or in combination with other elements, one or more of the steps disclosed herein (such as one or more of the steps illustrated in FIG. 3). All or a portion of network architecture 1000 may also be used to perform and/or be a means for performing other steps and features set forth in the instant disclosure.

Client systems 1010, 1020, and 1030 generally represent any type or form of computing device or system, such as example computing system 910 in FIG. 9. Similarly, servers 1040 and 1045 generally represent computing devices or systems, such as application servers or database servers, configured to provide various database services and/or run certain software applications. Network 1050 generally represents any telecommunication or computer network including, for example, an intranet, a WAN, a LAN, a PAN, or the Internet. In one example, client systems 1010, 1020, and/or 1030 and/or servers 1040 and/or 1045 may include all or a portion of system 100 from FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent Network-Attached Storage (NAS) devices configured to communicate with servers 1040 and 1045 using various protocols, such as Network File System (NFS), Server Message Block (SMB), or Common Internet File System (CIFS).

Servers 1040 and 1045 may also be connected to a Storage Area Network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to example computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the example embodiments disclosed herein may also be encoded as a computer program, stored in server 1040, run by server 1045, and distributed to client systems 1010, 1020, and 1030 over network 1050.

As detailed above, computing system 910 and/or one or more components of network architecture 1000 may perform and/or be a means for performing, either alone or in combination with other elements, one or more steps of an example method for controlling access to a peripheral device.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for controlling access to a peripheral device, at least a portion of the method being performed by a computing device comprising at least one processor, the method comprising:
   receiving, by the one or more computing devices, an input/output request related to an application process attempting to access the peripheral device;
   determining, by the one or more computing devices, whether the input/output request is anomalous with respect to the application process attempting to access the peripheral device, the determination indicating whether the input/output request is beyond a threshold level of abnormality for the application process;
   determining, by the one or more computing devices, an access state for the application process indicative of whether the application process will be allowed to gain access to the peripheral device, the access state being based on a context property of the application process;
   responding, by the one or more computing devices, to the input/output request with initiation of a virtual peripheral output from a virtual peripheral device when the request is beyond the threshold level of abnormality and when the access state is indicative of the application process not being allowed access to the peripheral device, wherein the virtual peripheral output transmitted to the application process:
     emulates an output of the peripheral device in an output format expected by the application process; and
     provides information to the application process about the access state and a reason for the access state; and
   generating, by the one or more computing devices, an alert to a user associated with the peripheral device that the application process has been denied access to the peripheral device.

2. The computer-implemented method of claim 1, wherein the determining of the access state includes at least one of:
   evaluating the context property based on a predefined rule indicative of whether the application process should be allowed access to the peripheral device, and
   receiving, by the one or more computing devices from a user, an indication of whether the application process should be allowed access to the peripheral device.

3. The computer-implemented method of claim 1, wherein the virtual peripheral output includes at least one of:
   information indicative of the access state of the application process, and
   information indicative of whether the application process is compatible with the peripheral device.

4. The computer-implemented method of claim 1, further comprising responding, by the one or more computing devices, to subsequent input/output requests from the application process with the virtual peripheral output from the virtual peripheral device.

5. The computer-implemented method of claim 1, wherein the responding, by the one or more computing devices, to the input/output request includes emulating a physical peripheral device using at least one video class driver.

6. The computer-implemented method of claim 1, wherein the peripheral device is a webcam, the virtual peripheral device is a virtual webcam, and the virtual peripheral output is a video stream.

7. A system for controlling access to a peripheral device, the system comprising:
   a receiving module, stored in memory, that receives an input/output request related to an application process attempting to access the peripheral device;
   a determination module, stored in memory, that:
     determines whether the input/output request is anomalous with respect to the application process attempting to access the peripheral device, the determination indicating whether the input/output request is beyond a threshold level of abnormality for the application process; and
     determines an access state for the application process indicative of whether the application process will be allowed to gain access to the peripheral device, the access state being based on a context property of the application process;
   a response module, stored in memory, that responds to the input/output request with initiation of a virtual peripheral output from a virtual peripheral device when the request is beyond the threshold level of abnormality and when the access state is indicative of the application process not being allowed access to the peripheral device, wherein the virtual peripheral output transmitted to the application process:

emulates an output of the peripheral device in an output format expected by the application process; and provides information to the application process about the access state and a reason for the access state;

an alert generation module, stored in memory, that generates an alert to a user associated with the peripheral device that the application process has been denied access to the peripheral device; and at least one physical processor configured to execute the receiving module, the determination module, the response module, and the alert generation module.

8. The system of claim 7, wherein the determination module determines the access state based at least in part on at least one of:

evaluation of the context property based on a predefined rule indicative of whether the application process should be allowed access to the peripheral device, and an indication, received from a user, of whether the application process should be allowed access to the peripheral device.

9. The system of claim 7, wherein the virtual peripheral output includes at least one of:

information indicative of the access state of the application process, and information indicative of whether the application process is compatible with the peripheral device.

10. The system of claim 7, wherein the response module responds to subsequent input/output requests from the application process with the virtual peripheral output from the virtual peripheral device.

11. The system of claim 7, wherein the response module emulates a physical peripheral device using at least one video class driver in response to the determination module determining that the access state is indicative of the application process not being allowed access to the peripheral device.

12. The system of claim 7, wherein the peripheral device is a webcam and the virtual peripheral device is a virtual webcam.

13. A non-transitory computer-readable medium comprising one or more computer-executable instructions that, when executed by at least one processor of a computing device, cause the computing device to:

receive an input/output request related to an application process attempting to access the peripheral device;

determining, by the one or more computing devices, whether the input/output request is anomalous with respect to the application process attempting to access the peripheral device, the determination indicating whether the input/output request is beyond a threshold level of abnormality for the application process;

determine an access state for the application process indicative of whether the application process will be allowed to gain access to the peripheral device, the access state being based on a context property of the application process;

respond to the input/output request with initiation of a virtual peripheral output from a virtual peripheral device when the request is beyond the threshold level of abnormality and when the access state is indicative of the application process not being allowed access to the peripheral device, wherein the virtual peripheral output transmitted to the application process:

emulates an output of the peripheral device in an output format expected by the application process; and provides information to the application process about the access state and a reason for the access state; and generate an alert to a user associated with the peripheral device that the application process has been denied access to the peripheral device.

14. The non-transitory computer-readable medium of claim 13, wherein the determining of the access state includes at least one of:

evaluating the context property based on a predefined rule indicative of whether the application process should be allowed access to the peripheral device, and receiving, from a user, an indication of whether the application process should be allowed access to the peripheral device.

15. The non-transitory computer-readable medium of claim 13, wherein the virtual peripheral output includes at least one of:

information indicative of the access state of the application process, and information indicative of whether the application process is compatible with the peripheral device.

16. The non-transitory computer-readable medium of claim 13, further comprising executable instructions that, when executed by the at least one processor of the computing device, cause the computing device to respond to subsequent input/output requests from the application process with the virtual peripheral output from the virtual peripheral device.

17. The non-transitory computer-readable medium of claim 13, wherein the responding to the input/output request includes emulating a physical peripheral device using at least one video class driver.

* * * * *